(12) United States Patent
Krishan et al.

(10) Patent No.: US 11,428,624 B2
(45) Date of Patent: Aug. 30, 2022

(54) COMB SENSOR FOR MEASURING COMBING RESISTANCE

(71) Applicant: The Procter & Gamble Company, Cincinnati, OH (US)

(72) Inventors: Kapilanjan Krishan, Singapore (SG); Jie Zhang, Buffalo Grove, IL (US); Siew Lay Lim, Singapore (SG); Wei Peng Goh, Singapore (SG); Aung Ko Ko Kyaw, Singapore (SG); Yi-Luen Ellen Do, Atlanta, GA (US); Ranasinghe Arachchilage Nimesha Ranasinghe, Woodlands (SG); Shienny Karwita Tailan, Singapore (SG); David Lewis Alexander Tolley, Singapore (SG); Ragavan Kalatharan, Singapore (SG); Xin Liu, Singapore (SG); Ning Xue, Beijing (CN); Chee Keong Michael Ho, Singapore (SG); Ee Lim Tan, Singapore (SG); Jingjing Lan, Singapore (SG)

(73) Assignee: The Procter & Gamble Company, Cincinnati, OH (US)

( * ) Notice: Subject to any disclaimer, the term of this patent is extended or adjusted under 35 U.S.C. 154(b) by 616 days.

(21) Appl. No.: 16/441,731

(22) Filed: Jun. 14, 2019

(65) Prior Publication Data

US 2019/0293548 A1   Sep. 26, 2019

Related U.S. Application Data

(63) Continuation of application No. PCT/US2018/041258, filed on Jul. 9, 2018.
(Continued)

(51) Int. Cl.
*G01N 19/02* (2006.01)
*A45D 24/10* (2006.01)
(Continued)

(52) U.S. Cl.
CPC ............. *G01N 19/02* (2013.01); *A45D 24/10* (2013.01); *A46B 15/0006* (2013.01); *G01L 1/00* (2013.01); *A46B 2200/104* (2013.01)

(58) Field of Classification Search
CPC ... A45D 2044/007; A45D 24/02; G01N 19/02
See application file for complete search history.

(56) References Cited

U.S. PATENT DOCUMENTS 2,566,965 A * 9/1951 Shaw .................. A45D 8/12
                                               132/156
2,792,007 A * 5/1957 Parmer ................ A45D 24/02
                                               132/156

(Continued)

FOREIGN PATENT DOCUMENTS

CN     101352285 A  *  1/2009
CN     204861708 U  * 12/2015

(Continued)

OTHER PUBLICATIONS

Espacenet Machine Translation of JP 2016073526 A Which Originally Published on May 12, 2016. (Year: 2016).*

(Continued)

*Primary Examiner* — David A. Rogers
(74) *Attorney, Agent, or Firm* — John G. Powell

(57) ABSTRACT

Disclosed herein is a comb sensor for measuring combing resistance, wherein the comb sensor comprises: a comb or brush comprising a handle, a head connected to the handle, and teeth connected to the head; and a bend sensor located on at least one of the teeth, to measure the bending of the one (Continued)

of the teeth. The present invention provides improved sensitivity and/or detailed measurement result.

6 Claims, 1 Drawing Sheet

Related U.S. Application Data

(60) Provisional application No. 62/534,685, filed on Jul. 20, 2017.

(51) Int. Cl.
*A46B 15/00* (2006.01)
*G01L 1/00* (2006.01)

(56) References Cited

U.S. PATENT DOCUMENTS

| | | | |
|---|---|---|---|
| 2,984,248 A * | 5/1961 | Sidelman | A45D 8/12 132/158 |
| 3,628,545 A * | 12/1971 | Moody | A45D 24/02 132/148 |
| 3,721,250 A * | 3/1973 | Walter | A45D 24/28 392/397 |
| 3,946,606 A | 3/1976 | Abrioux | |
| 3,960,160 A * | 6/1976 | Hogan | A45D 24/22 132/207 |
| 4,061,022 A * | 12/1977 | Yates | G01N 3/08 73/764 |
| 4,167,869 A | 9/1979 | Gikas | |
| 5,771,904 A * | 6/1998 | Lange | A46D 1/0284 132/159 |
| 5,865,190 A * | 2/1999 | Butler | A45D 8/20 132/270 |
| 5,947,130 A * | 9/1999 | Musum | A45D 24/22 132/270 |
| 6,189,540 B1 * | 2/2001 | Stovall | A45D 24/10 132/219 |
| 6,196,235 B1 * | 3/2001 | Kim | A46B 15/0077 132/148 |
| 6,425,295 B1 * | 7/2002 | Meginniss | A46B 15/0012 73/862.046 |
| 6,817,222 B2 * | 11/2004 | Day | G01N 33/4833 73/9 |
| 7,156,102 B2 * | 1/2007 | Ramet | A45D 24/34 132/270 |
| 8,151,624 B2 * | 4/2012 | Sherman | G01N 19/02 73/9 |
| 8,414,817 B2 * | 4/2013 | Honnefeller | A46D 1/04 264/296 |
| 8,875,719 B2 * | 11/2014 | Gueret | A46B 9/028 132/218 |
| 8,925,560 B2 * | 1/2015 | Heiberg | A45D 24/02 132/901 |
| 9,829,419 B2 * | 11/2017 | Fawcett | G01N 19/02 |
| 9,877,562 B2 * | 1/2018 | Guy-Rabi | A46B 3/22 |
| 10,151,684 B2 * | 12/2018 | Ganguli | G01L 1/22 |
| 10,426,397 B2 * | 10/2019 | Hutchings | A61B 5/448 |
| 10,650,711 B2 * | 5/2020 | Vugts | G09F 23/0082 |
| 10,716,391 B2 * | 7/2020 | Balooch | A61B 5/448 |
| 2003/0233861 A1 * | 12/2003 | Woolston | G01N 33/4833 73/9 |
| 2006/0184068 A1 * | 8/2006 | Shibuichi | A61B 7/00 600/587 |
| 2010/0282268 A1 * | 11/2010 | Honnefeller | A46D 1/00 15/207.2 |
| 2012/0222466 A1 * | 9/2012 | Bailey | A61B 5/448 73/9 |
| 2013/0312780 A1 * | 11/2013 | Rafaeli | A45D 24/30 132/118 |
| 2015/0342515 A1 | 12/2015 | Hutchings | |
| 2017/0138839 A1 * | 5/2017 | Ganguli | G01L 1/22 |
| 2019/0015182 A1 * | 1/2019 | Johnson | A61C 17/221 |
| 2020/0217779 A1 * | 7/2020 | Brada | A45D 2/001 |

FOREIGN PATENT DOCUMENTS

| | | | |
|---|---|---|---|
| CN | 105935318 A | * | 9/2016 |
| CN | 106596394 A | | 4/2017 |
| CN | 109198864 B | * | 6/2020 |
| DE | 2719482 A1 | * | 11/1978 |
| JP | 04193203 A | * | 7/1992 |
| JP | 2016073526 A | * | 5/2016 |
| JP | 2019054829 A | * | 4/2019 |

OTHER PUBLICATIONS

Espacenet Machine Translation of CN 106596394 A Which Originally Published on Apr. 26, 2017. (Year: 2017).*

PCT International Search Report and Written Opinion for PCT/US2018/041258 dated Oct. 9, 2018.

* cited by examiner

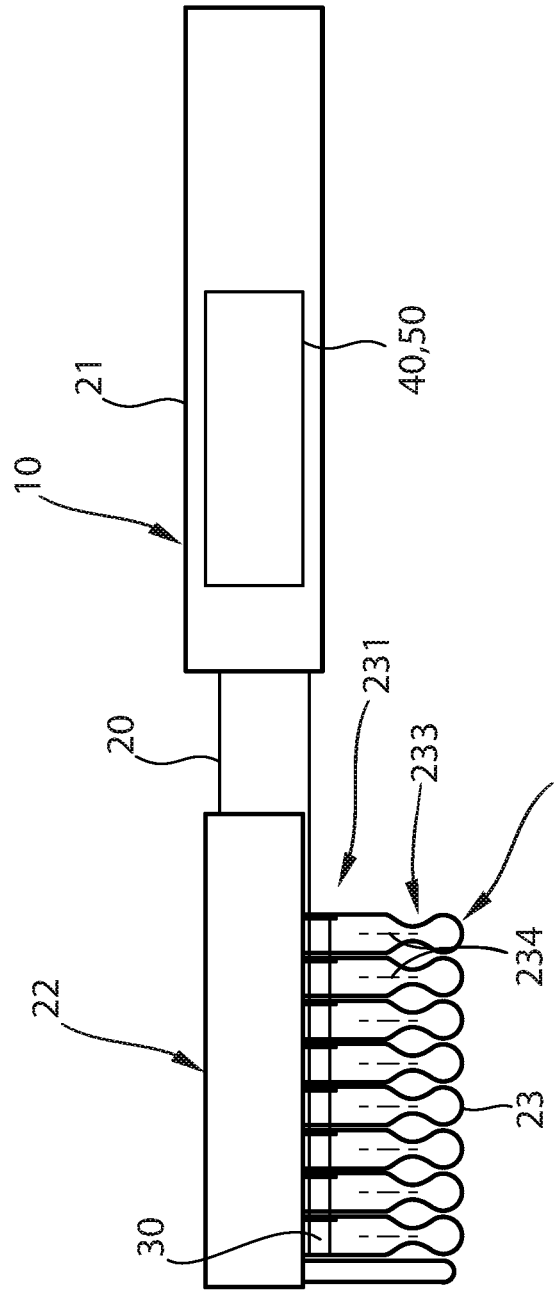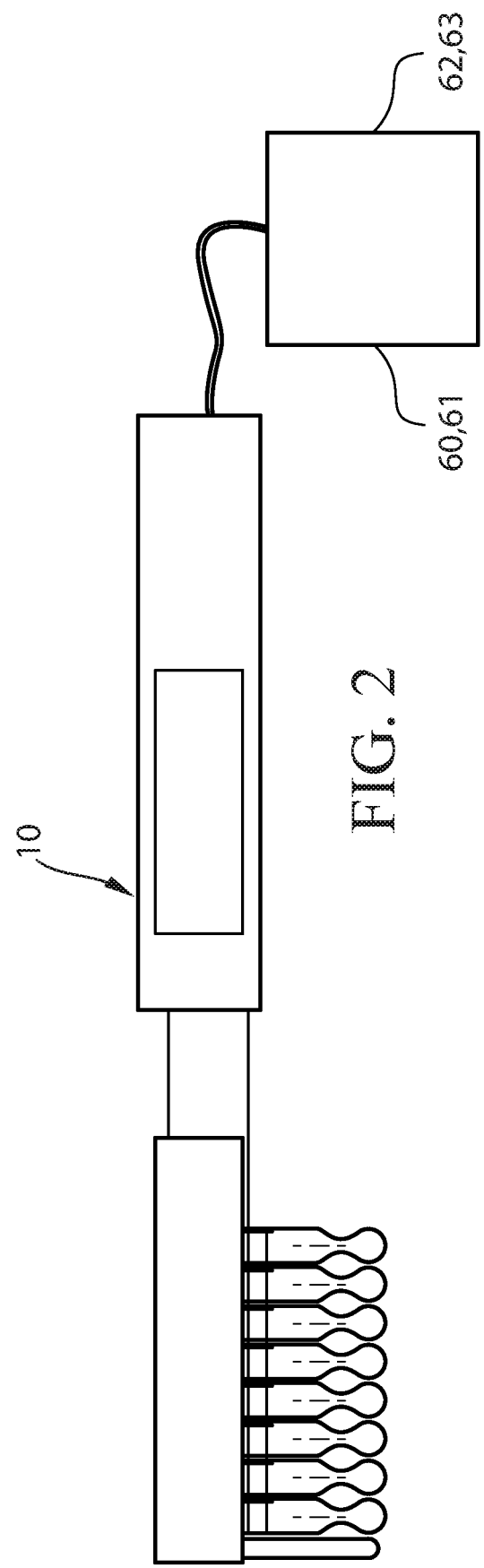
FIG. 1
FIG. 2

COMB SENSOR FOR MEASURING COMBING RESISTANCE

FIELD OF THE INVENTION

The present invention relates to a comb sensor for measuring combing resistance, wherein the comb sensor comprises: a comb or brush comprising a handle, a head connected to the handle, and teeth connected to the head; and a bend sensor located on at least one of the teeth, to measure the bending of the one of the teeth. The present invention provides improved sensitivity and/or detailed measurement result.

BACKGROUND OF THE INVENTION

Keratinaceous fibers, particularly human hair fibers, may be damaged over time. Damages may be caused by environmental factors, including air pollution, sun exposure, chlorine from water pool, and/or rain. Damages may also be caused by applying to the fibers grooming (cosmetic), chemical and/or mechanical treatments. When hair fibers are damaged, the hair fibers may have undesirable conditions of, for example, "fly-away hair", "split end", and/or color fade.

Assessing the condition including the degree of damages caused to keratinaceous fibers is of interest in order to understand the impact of various environmental factors as well as the impact of the cosmetic (grooming), chemical and mechanical treatments onto keratinaceous fibers. Such assessment is also of interest in order to demonstrate the efficacy of treatments used for preventing and/or repairing keratinaceous fiber damages. Several attempts for assessing keratinaceous fiber damages, using different methods and/or comb sensors, have already been reported.

Measuring combing resistance of keratinaceous fiber, especially its friction and/or detangling, is one of common ways to assess keratinaceous fiber conditions. Generally speaking, damaged and/or curled keratinaceous fibers cause increased combing resistance compared to healthier and/or straight keratinaceous fibers.

For example, FR2442607 discloses a way to measure combing force by using a comb or brush with strain gauges connected in bridge circuit and to counter circuit.

Another example include U.S. Pat. No. 4,167,869 disclosing an apparatus for measuring the incremental grooming force, wherein the apparatus includes a comb or brush with strain gages attached to it which change resistance when mechanically deformed, and wherein the change in resistance is electrically measured to provide an indication of incremental grooming force.

However, there still remains a need for providing a comb sensor which has improved sensitivity and/or which provides detailed measurement result. Such improved sensitivity and/or detailed measurement result include, for example, sensing more variations of the combing resistances at different locations of an individual hair.

SUMMARY OF THE INVENTION

The present invention is directed to a comb sensor for measuring combing resistance, wherein the comb sensor comprises:
a comb or brush comprising a handle, a head connected to the handle, and teeth connected to the head; and
a bend sensor located on at least one of the teeth, to measure the bending of the one of the teeth.

The present invention provides improved sensitivity and/or detailed measurement result.

BRIEF DESCRIPTION OF THE DRAWINGS

FIG. 1—illustrates one embodiment of a comb sensor according to the present invention.

FIG. 2 illustrates one embodiment of a comb sensor according to the present invention, with a wired connection to a computer which serves a display, data storage and calculator.

DETAILED DESCRIPTION OF THE INVENTION

Comb Sensor

The comb sensor of the present invention is for measuring combing resistance, wherein the comb sensor comprises:
a comb or brush comprising a handle, a head connected to the handle, and teeth connected to the head; and
a bend sensor located on at least one of the teeth, to measure the bending of the one of the teeth.

Comb or Brush

The comb sensor of the present invention comprises a comb or brush, wherein the comb or brush comprises: a handle; a head connecting to the handle; and at least one tooth or bristle connecting to the head.

The handle and head can be seen as two parts, for example, as shown in FIG. 1, wherein the handle is clearly separated from the head. Alternatively, the handle and head can be seen as one part, wherein the enlarged head part serves as a handle.

Preferably, the comb or brush comprises at least two teeth, more preferably at least about five teeth. Preferably, the comb or brush comprises up to about 50 teeth.

The length of the teeth can be about 15-100 mm, preferably about 30-70 mm. The gap between such teeth can be about 1-10 mm, and the length of the head (the distance between the first tooth to the final tooth, wherein the first tooth is located at the near end of the head from the handle, and the final tooth is located at the far end of the head from the handle) can be about 50-200 mm.

The handle, head and teeth can be made by any material, as long as bend sensors can detect bending of teeth.

The teeth can be in any shape, as long as bend sensors can detect bending of teeth. For example, the teeth can have a shape and/or an area that is easy to capture hairs near teeth tip. Such shapes/areas can be a concave area of a tooth which is concave toward to the center line of the tooth, as exemplified in FIG. 1. By such concave area, the gap to the next tooth is wider in the concave area of the tooth, compared to other areas of the tooth.

Sensor to Measure a Bending of Individual Teeth

The comb sensor of the present invention comprises a sensor to measure a bending (hereinafter "bend sensor") of the tooth, preferably a bending of the tooth where the sensor is located.

Preferably, the bend sensor is located on tooth. The bend sensors can be located on all of the teeth, and can be located on some of the teeth. The bend sensors are located on at least one of the teeth, preferably at least two teeth, more preferably at least three teeth, still more preferably at least five teeth. It is believed that by this location of bend sensor and the numbers of the bend sensor, the comb sensor of the present invention provides improved sensitivity.

The bend sensors useful herein are, for example, those selected from the group consisting of strain sensor, stress sensor, optical sensor, sensors with amplification elements/ circuits, location sensor, orientation sensor and mixtures thereof. Among them, preferred are strain sensor, stress sensor, optical sensor, sensors with amplification elements/ circuits, more preferred are strain sensors. When the bend sensors, for example being strain sensors, are located on the teeth, it is preferred that the bend sensors are located at regions where the strain of the teeth is maximal, for instance, on the root sides of the teeth which are close to their connections to the head.

When the bend sensors are located on the root sides of the teeth which are close to their connections to the head, it is further preferred that the root sides of the teeth are made by a material or a structure by which the root sides of the teeth bend more than tip sides of the teeth in order to further localize the strain of the teeth to this location. As for the materials, for example, the root side of the teeth can be made by a softer/elasticity/viscoelasticity/texture material than that for the tip sides of the teeth. As for the structure, for example, the root side may have a hole, slit, thinner thickness, and/or shorter width by which the root sides of the teeth bend more than tip sides of the teeth. Preferably, the root side has a hole, and also thinner thickness and/or shorter width, more preferably, shorter width.

The data/information from the bend sensor are used as combing resistance, with or without calculation and/or translation, and also with or without data/information from other sensors.

Sensor to Measure Comb Sensor Orientation

The comb sensor of the present invention may also comprises an orientation sensor to measure an orientation of the comb sensor.

Such orientation sensor can be located anywhere on the comb sensor, for example, on the handle or the head.

By combining the information from the orientation sensor with the information from the bend sensor, it is believed that the comb sensor can provide better sensitivity of combing resistance. For example, even with the same degree of bending, combing resistance may be assessed differently based on the orientation of the comb.

Sensor to Measure Comb Sensor Location

The comb sensor of the present invention may also comprises a location sensor to measure a location of the comb sensor.

Such location sensor can be located anywhere on the comb sensor, for example, on the handle or the head.

In one embodiment, the location sensor can be consolidated to the above orientation sensor, i.e., one single sensor can serve as both of the orientation sensor and the location sensor.

By combining the information from the location sensor with the information from the bend sensor, it is believed that the comb sensor can provide better sensitivity of combing resistance. For example, even with the same degree of bending, combing resistance may be assessed differently depending on how quickly the comb location is changing (combing at a higher/lower speed and/or acceleration/slowing down). The location sensor may also help infer variability in hair quality based on the location of the comb during combing.

Display

The comb sensor of the present invention may be either directly or indirectly connected to a display to show a measurement result.

The measurement result shown on the display can be: combing resistance which is a data from the bend sensor, or a translated or calculated from the data from the bend sensor with or without a data from the orientation sensor and/or location sensor; and/or a fiber condition which is assessed by the combing resistance. Such fiber conditions are, for example, damage, smoothness, tangling, roughness level, location of most combing, duration of combing, number of combing strokes etc. The display can show such measurement results one by one, or all concurrently. The measurement results can be shown by absolute values, relative values, indexes, and/or colors with or without indications.

The display can be located on the comb sensor, such as comb sensor handle. Alternatively, the display can be located separately from the comb sensor, and is located, for example, on PC screen and/or mobile device screen which has a wired or wireless connection with the comb sensor. In another example, the display can be located on both of the comb sensor and a separate display screen and/or mobile device screen which has a wired or wireless connection with the comb sensor.

Data Storage and Calculator

The comb sensor of the present invention may be either directly or indirectly connected to a data storage to memorize data from sensors and/or measurement results.

The comb sensor of the present invention may be either directly or indirectly connected to a calculator to calculate data from sensors to a measurement result.

The data storage and calculator can be located in the comb sensor such as comb sensor handle. Alternatively, the data storage and calculator can be located separately from the comb sensor, and are located, for example, in PC and/or mobile device which has a wired or wireless connection with the sensor. In another example, the data storage and calculator can be located in both in the comb sensor and in separate PC and/or mobile device which has a wired or wireless connection with the comb sensor.

The data storage and calculator can be combined. For example, MCU (Micro Controller Unit) can serve as both of the data storage and calculator.

Other Sensors

The comb sensor of the present invention may further comprise an additional sensor. Such additional sensors are, for example, those selected from the group consisting of moisture sensor, temperature sensor, sebum sensor, oil sensor, and any combinations thereof.

EXAMPLES

FIG. 1 illustrates one embodiment of a comb sensor according to the present invention. FIG. 2 illustrates one embodiment of a comb sensor according to the present invention, with a wired connection to a computer which serves a display, data storage and calculator.

In these embodiments, the comb sensor (10) comprises:
a comb (20) comprising a handle (21), a head (22) connected to the handle, and at least two teeth (23) connected to the head;
a bend sensor (30) located on at least two teeth to measure a bending of the tooth, more specifically, the bend sensors (30) being strain sensors located on the root sides (231) of the teeth (23) which are close to their connections to the head (22).

In these embodiments, the comb further comprises an orientation sensor (40) to measure an orientation of the comb sensor; and a location sensor (50) to measure a location of the comb sensor. In these embodiments, the location sensor (50) is consolidated to the orientation sensor (50), i.e., one single sensor can serve as both of the orientation sensor (40) and the location sensor (50). In these embodiments, such single sensor is located on the handle (21) of the comb.

Also, in these embodiment, the root sides (231) of the teeth (23) have a shorter width, and near tip sides (232) of the teeth (23), the teeth have a concave area (233) which is concave toward to the center line (234) of the tooth (23), as exemplified in FIG. 1. By such concave area, the gap to the next tooth is wider in the concave area of the tooth, compared to other areas of the tooth.

In the embodiment shown in FIG. 2, the comb sensor of FIG. 1 has a wired connection to a computer (60) which serves a display (61), data storage (62) and calculator (63), wherein MCU (Micro Controller Unit) can serve as both of the data storage (62) and calculator (63). In this embodiment, the display shows a measurement result which is combing resistance.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A comb sensor for measuring combing resistance, wherein the comb sensor comprises:
   a comb or brush comprising a handle, a head connected to the handle, and teeth connected to the head; and
   bend sensors located on at least two of the teeth, to measure the bending of the at least two teeth, wherein the root side of the teeth is made of a material or a structure by which the root side bends more than tip side of the teeth.

2. The comb sensor of claim 1, wherein the comb sensor further comprises an orientation sensor to measure an orientation of the comb sensor.

3. The comb sensor of claim 1, wherein the comb sensor further comprises a location sensor to measure a location of the comb sensor.

4. The comb sensor of claim 1, wherein the bend sensors are located on the root sides of the teeth which are close to their connections to the head.

5. The comb sensor of claim 1, wherein the bend sensor is selected from the group consisting of a strain sensor, stress sensor, optical sensor, transistor, location sensor, and mixtures thereof, preferably a strain sensor.

6. The comb sensor of claim 1, wherein data from the bend sensor is used to generate a fiber condition for natural or artificial human hair, the fiber condition being selected from damage, smoothness, tangling and roughness level.

* * * * *